Jan. 21, 1958   F. B. SMITH   2,820,838
METHOD OF DISPERSING CARBON BLACK IN BULK RUBBER
Filed March 30, 1954   2 Sheets-Sheet 1

CONVENTIONAL PROCESS

MAKE
CARBON BLACK
RUBBER MASTERBATCH
BY MIXING
FOR 6-10' IN
27 BANBURY
(50-60% UNDISPERSED
CARBON BLACK)

↓

ADD COMPOUNDING
INGREDIENTS TO
MASTERBATCH
AND
MIX 4-5' IN #27 BANBURY
(20% UNDISPERSED
CARBON BLACK)

↓

TRANSFER TO
ROLL MILLS FOR
AT LEAST 10-15'
ADDITIONAL MIXING
(2-4% UNDISPERSED
CARBON BLACK)

↓

TRANSFER TO
TIRE TREAD TUBER

Fig. 1

Fig. 3

PROCESS OF INVENTION

MIX CARBON BLACK
AND
ALCOHOL
FOR 5-10' IN
WERNER-PFLEIDERER MIXER

↓

TRANSFER TO
27 BANBURY FOR
6' MIX WITH RUBBER
AND COMPOUNDING
INGREDIENTS
(LESS THAN 2%
UNDISPERSED
CARBON BLACK)

↓

EXPRESS ALCOHOL

↓

TRANSFER TO
TIRE TREAD TUBER

Fig. 2

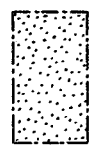

Fig. 4

INVENTOR.
FRANK B. SMITH
BY James J. Long
AGENT

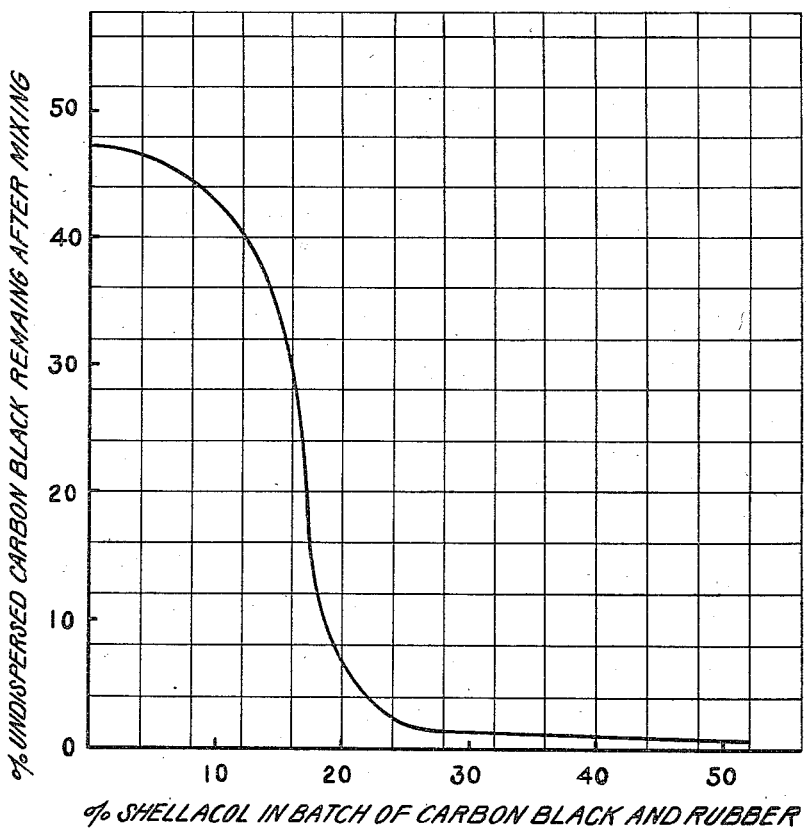

United States Patent Office 2,820,838
Patented Jan. 21, 1958

2,820,838

METHOD OF DISPERSING CARBON BLACK IN BULK RUBBER

Frank B. Smith, Detroit, Mich., assignor to United States Rubber Company, New York, N. Y., a corporation of New Jersey Application March 30, 1954, Serial No. 419,746

5 Claims. (Cl. 260—763)

This invention relates to an improved method of dispersing carbon black rubber, and more particularly it relates to an improved method of achieving microscopic dispersion of carbon black in rubber.

One object of the invention is to obtain an improved state of carbon black dispersion, particularly in rubber tire tread mixes.

Still another object is to obtain a faster rate of dispersion of carbon black in bulk rubber.

It is yet another object of the invention to reduce the power requirements for mixing carbon black with bulk rubber.

Still a further object of the invention is to obtain more effective use of mixing equipment by reducing the length of the mixing cycles in Banbury mixers and related equipment.

It is still a further object of the invention to produce rubber tire tread mixes of improved quality.

The relation existing between resistance to wear and degree of dispersion of the reinforcing agent, namely, carbon black, in rubber articles such as tire treads is well recognized among manufacturers of rubber goods. Briefly, when the dispersion of the carbon black is excellent, say below 1% undispersed carbon black as observed under the microscope, then tread wear is very good. When the dispersion of the carbon black is poor, say above 10% undispersed carbon black, the resultant tread wear is apt to be impaired.

In conventional processes, a considerable amount of work is expended in an effort to disperse the carbon black. In tire practice, two or more mixing stages are usually specified, using initially an internal mixer, such as a Banbury mixer, followed by a train of three or four roll mills to which the stock is successively transferred to complete the mixing. Usually the carbon black only is incorporated in the rubber in the Banbury, to form a "masterbatch," to which the other compounding ingredients, such as vulcanizing agents and accelerator, are added at a later mixing stage on a roll mill or in a Banbury mixer, and it is in such later mixing stage that the final state of dispersion of the carbon black is obtained.

The conventional mixing procedure therefore represents a substantial item of expense in rubber processing, since much power is consumed, the equipment is extremely heavy and expensive to install and maintain, and the necessarily long mixing cycles very much limit the productivity of this expensive equipment. Furthermore, in spite of the strenuous mixing efforts, the degree of microscopic dispersion of carbon black obtained in practice is extremely variable and leaves much to be desired.

There are at least two approaches to the problem of improving the mixing and rendering it more economical. The first possibility is the re-engineering of present equipment or the design of new machinery. In this work, one generally adheres to established principles, seeking a way of more effectively applying energy to the mix. My invention is based on a second approach, which—in contra-distinction to the first—is more of a physico-chemical nature.

The invention will be described with reference to the accompanying drawing, wherein:

Fig. 1 is a flow diagram representing a conventional tire tread stock mixing procedure;

Fig. 2 is a flow diagram representing a procedure of the invention;

Fig. 3 represents a microphotograph of a rubber-carbon black stock made by a conventional mixing process;

Fig. 4 is a similar view of a stock mixed in accordance with the invention; and

Fig. 5 is a graphical representation of the effect of concentration of alkanol on the amount of undispersed carbon black.

Before stating the principle of my invention, it should first be explained that I have observed that when carbon black is mixed with rubber, the carbon black is first compacted or agglomerated into large aggregates or flakes, due to the compacting action of the mill. This effect is noted on the first pass through the mill nip. It has been observed that these masses are difficult to disperse and largely lacking in affinity for the rubber matrix. Prolonged milling is necessary to incorporate and disperse the cohesive flakes of carbon black into the elastomer. My invention is based upon the discovery that if a definite amount of an alkanol having not more than four carbon atoms is present when the carbon black is initially masticated with the rubber in an internal mixer, this compacting or agglomerating effect does not take place, and there takes place a greatly improved wetting of the carbon black by the rubber, with a consequent more rapid rate of dispersion, better dispersion, reduced power, and associated improvements.

In practicing the invention I typically employ the kind of carbon black known as pelletized carbon black, which is a dense, highly compressed kind of carbon black that is relatively non-dusting and easy to handle. The properties of carbon blacks of various degrees of compression are illustrated in the following table:

| | Pounds per cubic ft. | Approximate specific gravity | Percent air |
|---|---|---|---|
| Original condition | 3.0 | 0.05 | 97.0 |
| Uncompressed | 13.4 | 0.21 | 88.0 |
| Semi-compressed | 21.1 | 0.34 | 81.0 |
| Heavy-compressed | 25.0 | 0.40 | 77.8 |
| Beads | 27.0 | 0.43 | 76.0 |

The so-called dustless or compressed carbon black (third and fourth grades, above), and especially the pelletized carbon black (beads) of high density, is employed in my invention.

In practicing the invention I typically first mix the dry carbon black (i. e., air-dry carbon black usually containing only a very small amount of moisture, such as some 1% moisture) with a definite amount of an alkanol of not more than four carbon atoms within a certain critical range. For purposes of the invention there must be added to the dry carbon black at least about 25 parts of the alkanol per 100 parts of the carbon black, and preferably somewhat more of the alkanol than this, say 50 to 160 parts, is used. However, in no case need the amount of the alkanol exceed 250 parts per 100 parts of carbon black. The preferred alkanol for use in the invention is ethanol, conveniently in one of its commercial denatured forms, although methanol and the propanols and butanols may also be used.

Mixing of the carbon black with the alkanol containing not more than four carbon atoms is suitably effected in a mixer capable of exerting substantial shearing action, such as a Werner-Pfleiderer mixer or a colloid mill, and in the course of the mixing the carbon black pellets or granules (such being the typical initial form of the carbon black used in the process) are disintegrated. Mixing periods of 5 to 10 minutes are generally adequate to produce a homogeneous composition, although the mixing may be continued for indefinitely longer periods, e. g., 30 minutes, if desired without ill effects, but such prolonged mixing is not necessary. It will be understood that it is essential not to evaporate the alkanol from the carbon black at this stage, since the specified amounts of alkanol must be present in the carbon black when it is subsequently mixed with the rubber.

The mixture of the alkanol containing not more than four carbon atoms prepared as described is then charged to a heavy duty gum rubber mixer of the Banbury type along with from 150 to 250 parts of rubber, per 100 parts of the carbon black, and the whole is subjected to severe mastication or shearing action. As a consequence of the presence of the specified amounts of the alkanol along with the carbon black, the dispersion of the carbon black in the rubber is greatly facilitated, in comparison to conventional procedure. To understand the remarkable effect produced by the invention, it should first be recognized that there is a definite distinction between the concept of "incorporation" of the carbon black and the concept of "dispersion" of the carbon black, although these terms are sometimes used loosely, and in fact interchangeably, in the prior art. The difference is clear if one examines the rubber mixture under the microscope. Carbon black can be incorporated, yet not dispersed. The mixing process is roughly comprised of the following successive stages:

(1) Incorporation (absorption of the carbon black by the rubber).

(2) Homogenization (gross dispersion).

(3) Dispersion (microscopic and sub-microscopic mixing of the carbon black aggregates and particles).

In phase (1) the carbon black is absorbed by the rubber. In phase (2) the carbon black is distributed in the rubber matrix more or less uniformly. In the absorption process small amounts of rubber pick up large amounts of the carbon black. Redistribution occurs with continued mixing in phase (3) and the carbon black is finally dispersed as microscopic and sub-microscopic particles or aggregates. The distinguishing feature of my process is that it gives a remarkably faster rate of microscopic dispersion, or an improved degree of microscopic dispersion, depending upon how one wishes to utilize the process. Thus, by masticating the alkanol-carbon black mixture with the gum rubber for normal mixing times one obtains a far superior degree of microscopic dispersion than in conventional processes, or one can mix for considerably less than the conventional mixing time and still obtain a degree of microscopic dispersion that is as good as that obtained by conventional practices taking a much longer time.

It should be emphasized here that the effect of the specified amounts of the alkanol of four carbon atoms or less in admixture with the carbon black is unlike the effect that would be obtained in the presence of liquids having a swelling or solvent action on the rubber. Liquids having a solvent or swelling action, such as oils, benzene, etc., may produce a more rapid incorporation (distinguished from true microscopic dispersion above) of the carbon black in the rubber, and therefore upon superficial observation it might be concluded that such liquids are aiding the mixing operation, but I have determined by microscopic observation that the actual state of dispersion of the carbon black is not improved by the presence of such liquids. In fact, I have observed that liquids which do swell rubber greatly, in contrast to the alkanols of less than five carbon atoms, which are of course devoid of swelling action, actually lead to much poorer microscopic dispersion, and they are therefore undesirable.

In place of preparing the mixture of carbon black containing the required amount of the alkanol of the required class beforehand in a Werner-Pfleiderer mixer or the like and adding this mixture to the bulk rubber in the Banbury, I may instead prepare the carbon black-alkanol mixture in the Banbury before or after adding the bulk rubber thereto. In any event it is essential that the specified amount of the alkanol be present when the carbon black is initially masticated with the rubber.

It is important to note that the beneficial effects of the present invention are obtainable only when the alkanol, carbon black and rubber are mixed under confinement in an internal mixer, where the mix is positively maintained under pressure in engagement with the masticating blades of the mixer. The desired effect is not obtained on an open roll mixer, where the alkanol-carbon black would merely be squeezed out of the rubber as the mixture passed through the nip of the mill rolls.

After the alkanol, carbon black and rubber have been masticated together in the internal mixer sufficiently to produce a suitable degree of microscopic dispersion, it is necessary to remove the greater part of the alkanol from the mix. I typically accomplish this by expressing the alkanol out of the mix, suitably by discharging the mixture from the Banbury onto a squeeze roll or other expressing device, wherein the alkanol is removed from the rubber by application of pressure. Devices suitable for this purpose are known, and may be of the type shown, for example, in U. S. Patent 2,371,722. Because of the fact that the alkanol is thus expressed and removed from the mixture, there should not be employed, previous to this stage, any rubber compounding ingredients which are soluble in the alkanol to any substantial extent, since such alkanol-soluble ingredients would of course be lost when the alkanol is expressed from the mixture. If alkanol-soluble compounding ingredients are present, the alkanol should be removed by evaporation, in order to avoid loss of such compounding ingredients.

Referring to the drawing, and in particular to Fig. 1, it will be observed that in the usual conventional factory practice, the carbon black and rubber are first mixed together in an initial mix known as a masterbatch, and such mixing typically leaves some 50–60% of the carbon black in an undispersed form (as measured by the procedure described in Example 1, below). The next step is to continue the mixing in the Banbury while adding the remaining compounding ingredients, whereupon the undispersed carbon black is reduced to about 20%. The dispersion of the carbon black is still far from complete, and it is not until the stock is further mixed on roll mills, prior to being introduced to the tubers or extruders, that the undispersed carbon black is reduced to anywhere near an acceptable level.

In contrast to the foregoing, the method of the invention as shown in Fig. 2, typically employs a brief preliminary mixing of the carbon black and the alkanol of four carbon atoms or less, and a subsequent mixing for only some six minutes in the Banbury is sufficient to reduce the undispersed carbon black to an unusually low and more than adequate level, even without any preliminary masterbatching. After removing the alkanol from the stock, the batch is in condition to be charged directly to the tubers without any necessity for an intermediate line of roll mills.

The method of the invention therefore simplifies factory mixing practice considerably, while at the same time making possible improvements in quality. The economies made possible by the invention will be particularly evident from a comparison of the necessary times which the stock must spend in the Banbury mixer in the conventional and in the present process. In the present process the necessary time in the Banbury mixer is very much reduced, and therefore the productivity of a Banbury mixer is greatly increased, or a given rate of productivity may be achieved with fewer or smaller Banbury mixers. Since the Banbury mixers are extremely heavy duty machines that require a substantial initial capital investment and that are expensive to maintain and to operate because of the large power consumption, it will be apparent that this feature of the invention represents a substantial economy. Similarly the possibility of dispensing with the usual additional roll mills, prior to the tuber, represents a further economy. These economies more than offset the comparatively small expense of the additional machinery used in the present process to make the carbon black-alkanol mix and to remove the alkanol, since such equipment is comparatively lighter and less expensive to install and operate.

The following examples will illustrate the practice of the invention in more detail. In the examples all parts are expressed by weight.

EXAMPLE I

To establish a standard of comparison for demonstrating the improved dispersion obtainable by the method of the invention, a test stock is first mixed by a conventional procedure, without using the alkanol of four carbon atoms or less. In this test stock 100 parts of carbon black is mixed with 195 parts of smoked sheet rubber along with about 11 parts of stearic acid in a size B laboratory Banbury mixer operated at a slow rotor speed of 75 R. P. M. for a 3½ minute mixing cycle to make a carbon black masterbatch. The masterbatch is then sheeted out on a roll mill. To this masterbatch additional conventional compounding ingredients including the usual small amounts of sulfur, accelerator, zinc oxide, and antioxidant are then added, and a final mixing cycle of two minutes' duration is carried out in the Banbury mixer. The stock is then discharged from the Banbury and sheeted once through a laboratory mill set for 0.100 gauge. The percent undispersed carbon black is measured in samples of the mixed stock by observing thin slices of the stock under the microscope at a magnification of 400×. Undispersed black appears as opaque flake fragments or aggregates in contrast with comparatively transparent adjacent areas wherein the carbon black is well dispersed. By projecting the microscopic image onto a calibrated screen, the area of the undispersed carbon black is determined, and, knowing the percent carbon black in the sample and the area and thickness of the sample, as well as the specific gravity of the carbon black and of the stock, the percent undispersed carbon black is readily calculated. The percent undispersed carbon black may be defined as that portion of the total carbon black in a given stock in the form of fragments measurable at a magnification of 400×.

To demonstrate the invention, there is then prepared a paste consisting of 100 parts of carbon black and 160 parts of a commercial denatured ethanol sold under the trade name "Shellacol" by mixing these materials for 10 minutes in a Werner-Pfleiderer or Baker-Perkins mixer. This paste is then mixed with about 195 parts of rubber and 11 parts of stearic acid in the same manner as the standard test mix described previously. After the batch has knitted together the bulk of the "Shellacol" is drained out by opening the discharge side of the Banbury. The stock is sheeted out on a mill and additional drying of the stock is effected by heating in a hot air oven overnight at 225° F. in this experimental stock, although on a commercial scale this step could be dispensed with by using efficient equipment to express almost all of the "Shellacol" from the stock mechanically, and relying on the heat applied in a final brief milling operation to complete the drying if necessary. The thus-dried stock (masterbatch) is then compounded with the usual vulcanizing ingredients by mixing for 2 minutes in the Banbury, in the same manner as the control stock.

The comparative results of such standard test mix and the mix of the invention using the commercial denatured ethanol are shown in the following Table I.

Table I

COMPARISON OF CONVENTIONAL PROCEDURE WITH PROCEDURE OF INVENTION

|  | Test A | Test B |
|---|---|---|
| Composition of paste: |  |  |
| MPC #3 carbon black |  | 100 |
| Shellacol |  | 160 |
|  |  | 260 |
| Composition of masterbatch: |  |  |
| Plasticated smoked sheet | 195 | 195 |
| Paste of carbon black and Shellacol |  | 260 |
| MPC #3 carbon black | 100 |  |
| Stearic acid | 11 | 11 |
| Undispersed carbon black: After masterbatching percent | 47 | 0.9 |
| Power consumed in masterbatching kilowatt-hour | 0.24 | 0.15 |
| Physical properties: |  |  |
| After curing 45 min. at 45# steam 300% modulus (p. s. i.) | 1,650 | 1,430 |
| Tensile (p. s. i.) | 4,200 | 3,800 |
| Elongation, percent | 565 | 565 |
| 212° F. tear, lbs | 1.9 | 4.4 |
| Torsional hysteresis, 286° F | .103 | .085 |
| Relative abrader wear | 116 | 135 |
| Undispersed carbon black: In final stock percent | 11 | 0.4 |

It will be noted that at the conclusion of the initial or masterbatching mix, the carbon black was 47% undispersed in the conventional stock, but only 0.9% undispersed in the masterbatch of the invention. This remarkable improvement is preserved and accentuated in the final stock, wherein 11% of the carbon black is undispersed in the conventional mix, whereas only 0.4% of the carbon black remained undispersed in the stock of the invention. Furthermore, in a series of such tests, it is observed that the results obtained with the conventional mix are extremely variable, whereas the results obtained by the mixing procedure of the invention are consistent and uniform. Fig. 3 shows the microscopic appearance of the conventional stock, while Fig. 4 shows the appearance of the stock mixed in accordance with the invention. The opaque areas of undispersed carbon black in Fig. 3 contrast with the uniform appearance of Fig. 4.

The physical properties of the vulcanized stocks, as illustrated in Table I, above, show that the vulcanizates processed in accordance with the invention compare favorably with those of the conventionally processed mixes in tensile, modulus, and elongation. The improved dispersion of the mixes of the invention is reflected in lowered hysteresis and superior abrasion resistance, as well as enhanced tearing and cutting resistance.

It is also significant to note that considerably less power was necessary to produce the superior mix of the invention in comparison with the conventional mix.

Similar results are obtained by substituting in the foregoing example the other alkanols of four carbon atoms or less. This is in direct contrast to the results obtained if one attempts to substitute higher aliphatic alcohols in the process. The higher aliphatic alcohols in similar tests have been found to produce no improvement in microscopic dispersion of the carbon black.

EXAMPLE II

In this example the effect of varying the quantity of the alkanol of four carbon atoms or less is demonstrated. Pastes of 100 parts of carbon black MPC #3 containing varying quantities of "Shellacol" as indicated in Table II, below, were mixed as described in Example I and then added to 195 parts of rubber in the Banbury mixer, where the mixture was worked for 3½ minutes. The amount of the carbon black in the undispersed condition was then determined by the microscopic test described, with the results shown in Table II:

*Table II*

| Test | O | D | E | F | G | H |
|---|---|---|---|---|---|---|
| Parts Shellacol in 100 parts carbon black | None | 32 | 67 | 92 | 113 | 130 |
| Percent Shellacol in total batch | None | 12 | 25 | 34 | 42 | 48 |
| Percent undispersed carbon black | 70.0 | 45.6 | 1.02 | 0.68 | 0.99 | 0.89 |

The data of Table II are shown in graphical form in Fig. 5. It will be observed that a most remarkable reduction in the amount of undispersed carbon black occurs suddenly when about 25–30 parts of the alkanol (in 100 parts of the carbon black) is present. After the concentration of alkanol exceeds about 50 parts further reduction in the amount of undispersed carbon black is only very small, and the undispersed carbon black tends to level off at an extremely low value.

In place of preparing the carbon black-alkanol paste beforehand in a separate mixing operation, good results are also obtainable by preparing the paste "in situ" in the Banbury mixer, that is, by charging the carbon black, the alkanol of less than five carbon atoms, and the rubber directly to the Banbury. In all cases the alkanol must be present when the mixing of the carbon black with the rubber takes place.

EXAMPLE III

In order to contrast the effect of the use of the alkanol of four carbon atoms or less in accordance with the invention on the dispersion of carbon black with the undesirable effect of materials which have a solvent or swelling action on rubber, Example I was repeated, using a paste made with carbon tetrachloride, in place of the alkanol. After a 6 minute initial mix, followed by a 2 minute final mix, the amount of undispersed carbon black amounted to 90.5%. This contrasts with the less than 1% undispersed carbon black obtained with the alkanol paste, and, in fact, it is actually far worse than the dispersion obtained with a conventional mix containing no liquid at all.

The term "rubber" as used herein comprehends not only natural rubber, but the various synthetic rubbers known to be equivalent thereto for the purpose of making carbon black-reinforced vulcanizates suitable for tire treads and similar mechanical rubber goods.

Having thus described my invention, what I claim and desire to protect by Letters Patent is:

1. An improved method of effecting microscopic dispersion of carbon black in a rubber stock comprising masticating in an internal mixer a mixture comprising 100 parts of compressed carbon black, 150 to 250 parts of rubber, and from about 25 to 250 parts of an alkanol having from one to four carbon atoms, and thereafter removing the said alkanol from the mixture.

2. An improved method of effecting microscopic dispersion of carbon black in a rubber stock comprising masticating in an internal mixer a mixture comprising 100 parts of compressed carbon black, 150 to 250 parts of rubber, and from about 50 to 160 parts of an alkanol having from one to four carbon atoms, and thereafter removing the said alkanol from the mixture.

3. An improved method of effecting microscopic dispersion of carbon black in a rubber stock comprising masticating in an internal mixer a mixture comprising 100 parts of pelletized carbon black, 150 to 250 parts of rubber, and from about 25 to 250 parts of an alkanol having from one to four carbon atoms and thereafter removing the said alkanol from the mixture.

4. An improved method of effecting microscopic dispersion of carbon black in a rubber stock comprising preparing a uniform paste of 100 parts of compressed carbon black and from 50 to 160 parts of ethanol, adding the said paste to from 150 to 250 parts of rubber in an internal mixer and masticating the said ingredients to produce a uniform mixture, and thereafter removing the ethanol from the mixture.

5. An improved method of effecting microscopic dispersion of carbon black in a rubber stock comprising preparing a uniform paste of 100 parts of pelletized carbon black and from about 25 to 250 parts of ethanol, adding the said paste to from 150 to 250 parts of bulk rubber in an internal mixer and masticating the said ingredients to produce a uniform mixture, the said mixture being composed of ethanol-insoluble ingredients, and thereafter expressing the ethanol from the mixture.

References Cited in the file of this patent

UNITED STATES PATENTS

| 1,245,700 | Geer | Nov. 6, 1917 |
| 2,617,782 | Paton et al. | Nov. 11, 1952 |
| 2,650,641 | Hiatt et al. | Sept. 1, 1953 |

OTHER REFERENCES

Drogin et al.: Ind. & Eng. Chem., Feb. 1944, pages 124–125.